(12) United States Patent
Thum

(10) Patent No.: US 7,013,922 B2
(45) Date of Patent: Mar. 21, 2006

(54) RECREATIONAL VEHICLE ATTACHMENT TO SECURE A SEWAGE DISCHARGE HOSE

(76) Inventor: Joseph Steven Thum, 4450 Iron Mtn. Rd., Arnold, MO (US) 63010

( * ) Notice: Subject to any disclaimer, the term of this patent is extended or adjusted under 35 U.S.C. 154(b) by 257 days.

(21) Appl. No.: 10/642,819

(22) Filed: Aug. 19, 2003

(65) Prior Publication Data

US 2005/0039808 A1    Feb. 24, 2005

(51) Int. Cl.
*E03C 1/12* (2006.01)
(52) U.S. Cl. .......................... 137/899; 248/75; 248/79
(58) Field of Classification Search ................ 137/899; 249/75, 76, 79
See application file for complete search history.

(56) References Cited

U.S. PATENT DOCUMENTS

| | | | |
|---|---|---|---|
| 2,859,007 A | | 11/1958 | Cooke |
| 3,712,331 A | | 1/1973 | Otto |
| 3,897,923 A | * | 8/1975 | Papke et al. .................. 248/75 |
| 4,722,556 A | | 2/1988 | Todd |
| 4,796,926 A | | 1/1989 | Rapsilver |
| 5,033,702 A | * | 7/1991 | Robbins ..................... 248/83 |
| 5,311,909 A | | 5/1994 | Adcock |
| 5,330,233 A | | 7/1994 | Kress |
| 5,904,183 A | | 5/1999 | Leech |
| 5,947,156 A | | 9/1999 | Tomczyk |
| 5,971,438 A | | 10/1999 | Johnson |
| 6,786,462 B1 | * | 9/2004 | Bland ......................... 248/75 |

* cited by examiner

Primary Examiner—Kevin Lee

(57) ABSTRACT

A one-piece body attachment guides and secures the distal end of a recreational vehicle sewage discharge hose relative to the inlet of a relatively stationary sewage receptacle. Two vertical, spaced apart, parallel sidewalls and a rigidly connected end wall form a partially enclosed space that receives a horizontal portion of the hose, an immediately downstream ninety degree bent portion of the hose and an immediately downstream vertical straight portion of the hose. Abutments are rigid to the sidewalls to interfere with relative movement of the hose and attachment by being located above the bottom edge a distance substantially greater and/or substantially less than one-half the distance between the inner faces of the sidewalls, which are spaced apart a distance substantially equal to the diameter of the hose. The detents are wedge shaped for first compressing the adjacent walls of the hose as the hose is relatively moved between the sidewalls and then the detents permit the hose to expand, to securely hold the hose and attachment inter-connected. The detents are preferably spaced from the end wall a distance greater than the diameter of the hose plus the radius of the bent portion.

11 Claims, 4 Drawing Sheets

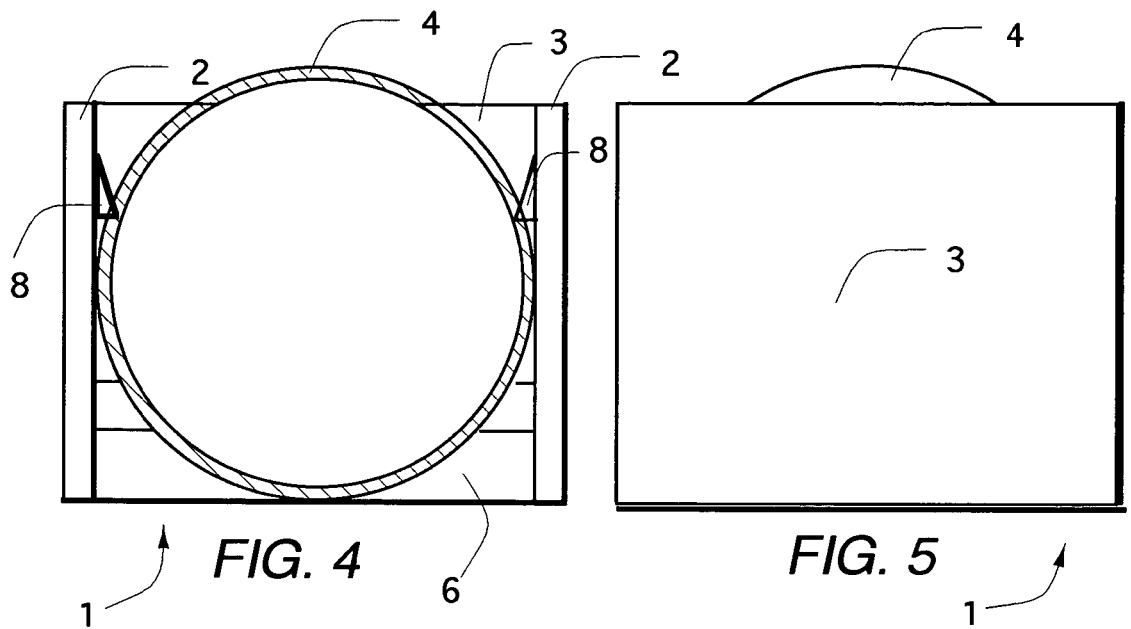
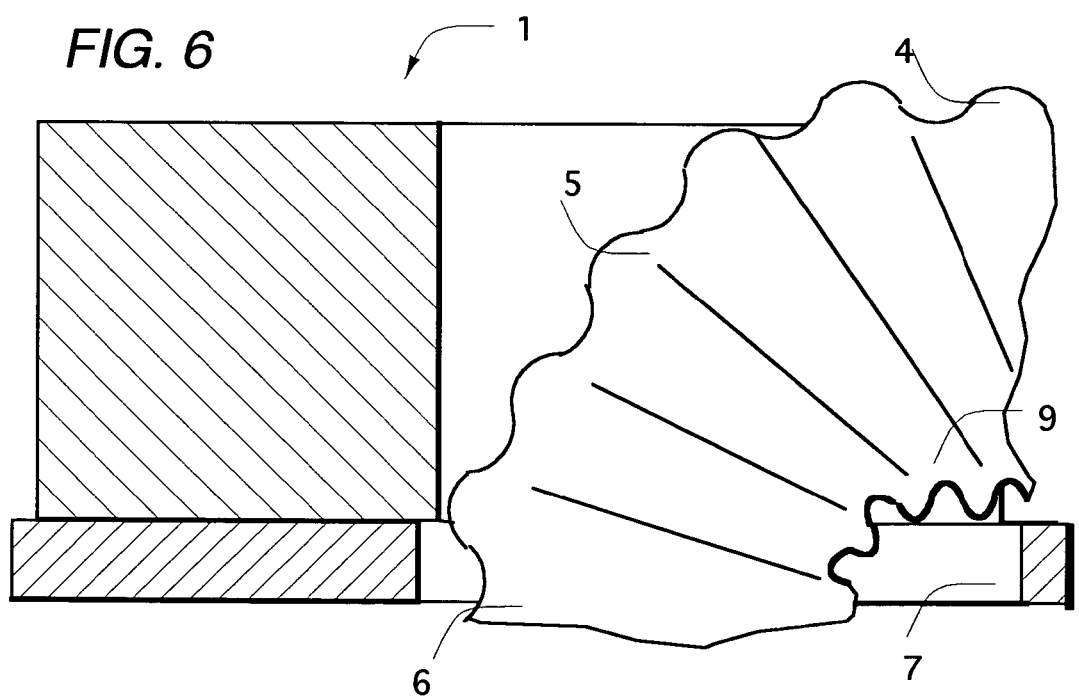

RECREATIONAL VEHICLE ATTACHMENT TO SECURE A SEWAGE DISCHARGE HOSE

FIELD OF THE INVENTION

The present invention relates to the transfer of sewage from a recreational vehicle through a hose to the inlet of a relatively stationary disposal site receptacle.

BACKGROUND OF THE INVENTION

The transfer of fluid from a recreational vehicle sewage storage container to a receptacle inlet through a hose has been suffering from a problem of reliably holding the hose against inherent elastic restorative forces in the hose itself and dynamic fluid flow forces exerted on the hose during fluid transfer, which together tend to dislodge the hose from the inlet, with resulting spillage.

Therefore, there is a need for an improved transfer of fluid from a recreational vehicle sewage storage container to a receptacle inlet through a hose.

The basic problem, some partial solutions and different hose holders are disclosed in U.S. Pat. No. 5,311,909 issued May 17, 1994 to Adcock; U.S. Pat. No. 5,330,233 issued Jul. 19, 1994 to Kress; U.S. Pat. No. 2,859,007 issued Nov. 4, 1958 to Cooke; U.S. Pat. No. 3,712,331 issued Jan. 23, 1973 to Otto; U.S. Pat. No. 4,722,556 issued Feb. 2, 1988 to Todd; U.S. Pat. No. 4,796,926 issued Jan. 10, 1989 to Rapsilver; U.S. Pat. No. 5,904,183 issued May 18, 1999 to Leech; U.S. Pat. No. 5,947,156 issued Sep. 7, 199 to Tomecyk; and U.S. Pat. No. 5,971,438 issued Oct. 26, 1999 to Johnson.

SUMMARY OF THE INVENTION

The present inventor has analyzed the above-mentioned problem, identified and analyzed causes of the problem, and provided solutions to the problem, which are each parts of the present invention. The solutions will be set forth below. The present invention is advantageous in overcoming the problem to an improved extent, particularly in reliably guiding and securing the distal end of a recreational vehicle sewage discharge hose relative to the inlet of a relatively stationary sewage receptacle.

The preferred embodiment attachment is a one-piece body, that is with no moving or separable parts, having two vertical, spaced apart, parallel sidewalls and an end wall rigidly connecting adjacent ends of the sidewalls to form a partially enclosed space. The partially enclosed space receives the following portions of the distal end of the hose, which includes a substantially horizontal portion, an immediately downstream substantially ninety degree bent portion and an immediately downstream substantially vertical straight portion.

At least one abutment is rigidly part of the body, and when the abutment is more than the sidewalls, it is connected to one or both of the sidewall inner faces opposite from the end wall. The abutment interferes with removal of the discharge hose from the enclosed space by being located from the bottom edge of the sidewalls a distance substantially greater or less than one-half the distance between the inner faces of the sidewalls. The inner faces of the sidewalls are spaced apart by a distance substantially equal to the diameter or width of the sewage disposal hose within the enclosed space.

The abutments may be detents that are wedge shaped for first compressing the adjacent walls of the sewage hose as the hose and attachment are relatively moved to place the hose between the sidewalls and then permitting the hose walls to expand, so that the detents trap and securely hold or retain the hose and attachment together, with the attachment weight being added to that of the hose distal end. The detent width is preferably, though not necessarily, less than the spacing between the adjacent peaks of a corrugated standard recreational vehicle sewage hose to prevent axial hose movement according to one usage. The detents are preferably, though not necessarily, spaced from the end wall a distance greater than the diameter of the sewage hose plus the radius of curvature of the bent portion within the partially enclosed space.

Among recreational vehicle operators, it is well known that a problem exists in reliably discharging sewage from a temporary tank within the vehicle to a relatively stationary sewage receptacle through a discharge hose without spillage, due to the discharge hose becoming disengaged from the inlet to the sewage receptacle. The problem is partly caused by the operator being required at a discharge pump or valve on the vehicle. Therefore the operator is unavailable to securely hold the discharge hose at the sewage receptacle inlet against the forces of the inherent elasticity bias of the discharge hose and dynamic fluid forces of sewage being discharged through the discharge hose exerting reaction forces.

Although the problem, its causes and the solution of the preferred embodiment are disclosed with respect to a self-propelled wheeled recreational vehicle, the same problem causes and solution apply equally well to certain other vehicles, including airplanes, boats and the like that have temporary storage of sewage and other fluids that are preferably not discharged to the general environment.

Numerous examples of solutions to the above problem exist in the prior art, with varying degrees of success. Among them are the following.

The U.S. Pat. Nos. 5,311,909 and 5,330,233 to Adcock and Kress, respectively, disclose attachments that are similar in that they both have two-part collars that are attached near the distal end of the discharge hose by having the collar arms pivot about a hinge pin to a hose encircling position where they are temporarily locked together with a movable locking mechanism. The movable multiple parts contribute substantially to the complexity, cost and unreliability of the devices. The locks and hinges have moving surfaces that easily corrode if made of strong materials or are susceptible to breakage if made of less strong materials, particularly under the damp, stale and rough storage environment of a movable vehicle and adjacent the hose having residual fluid contributing to the damp storage conditions. The complexity of usage also makes the use difficult and unpleasant. As recognized by the present inventor and as seen in FIGS. 1 and 2 of the Adcock patent, these devices appear to engage only one portion of the hose adjacent the distal end, namely the horizontal portion and thereby the devices do not directly hold down the bent and vertical portions. Also, the present inventor recognizes that the nature of the device permits and to some extent requires installation on the hose remotely from the sewage receptacle inlet, to thereby lessen its effect proportionately. The present inventor also recognizes that the detent of the Kress device has a limited effect.

The U.S. Pat. No. 2,859,007 issued Nov. 4, 1958 to Cooke, U.S. Pat. No. 3,712,331 issued Jan. 23, 1973 to Otto, U.S. Pat. No. 4,722,556 issued Feb. 2, 1988 to Todd, U.S. Pat. No. 4,796,926 issued Jan. 10, 1989 to Rapsilver, U.S. Pat. No. 5,904,183 issued May 18, 1999 to Leech, U.S. Pat. No. 5,947,156 issued Sep. 7, 199 to Tomeczyk, and U.S. Pat. No. 5,971,438 issued Oct. 26, 1999 to Johnson disclose hose holding attachments that are complicated, subject to breakage due to the complicated structure and costly in proportion to their complication.

Therefore, the present invention analysis of the prior art as to its problems and their causes has lead to the recognition of the need for and the solution of a more effective sewage disposal attachment, method of sewage disposal and sewage disposal system.

Still other aspects, features, and advantages of the present invention are readily apparent from the following detailed description, simply by illustrating a particular embodiment and implementations, including the best mode contemplated by the inventor for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of a preferred embodiment, best mode and example, but not defined by way of limitation. Further objects, features and advantages of the present invention will become more clear from the following detailed description of a preferred embodiment and best mode of implementing the invention, as shown in the figures of the accompanying drawing, in which like reference numerals refer to similar elements, wherein:

FIG. 4 is an elevation view of the right side of the attachment of FIG. 1, with a first example of a sewage disposal hose being received therein;

FIG. 5 is an elevation view of the left side of the attachment of FIG. 1, with the first example of a sewage disposal hose being received therein;

FIG. 6 is a side elevation cross-sectional view of the attachment, taken along line II—II of FIG. 1, with the first example of a sewage disposal hose being received therein;

DESCRIPTION OF THE PREFERRED EMBODIMENT

An article of manufacture, a system and method are described for the purposes of explanation, and numerous specific details are set forth in order to provide a thorough understanding of the present invention, including representative usage with examples of two different types of sewage hose distal ends. It is apparent, however, to one skilled in the art that the present invention may be practiced without these specific details or with an equivalent arrangement. In other instances, well-known structures are shown in elementary form in order to avoid unnecessarily obscuring the present invention.

Figure 1:
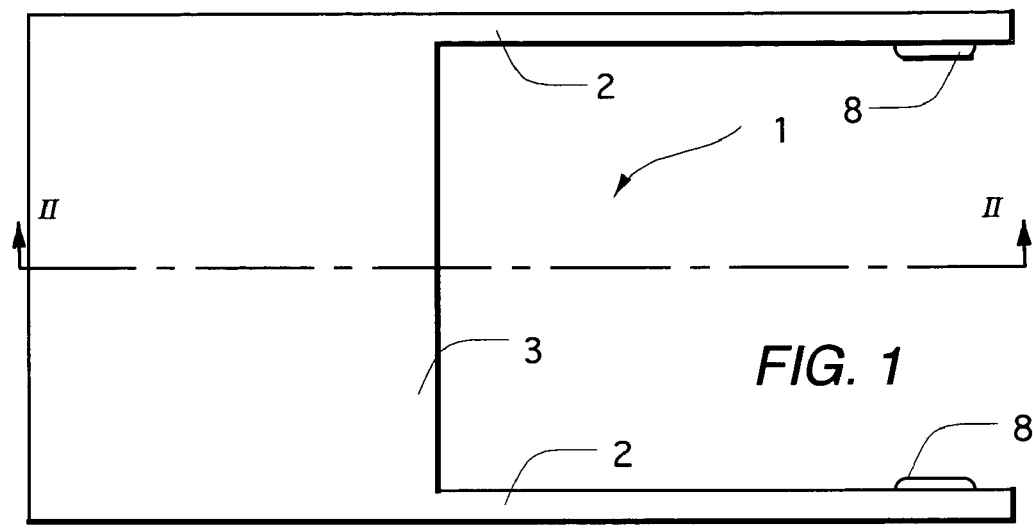
FIG. 1 is a top plan view of an implemented embodiment of the present invention discharge hose attachment, with the bottom view being substantially identical.
Figure 2:
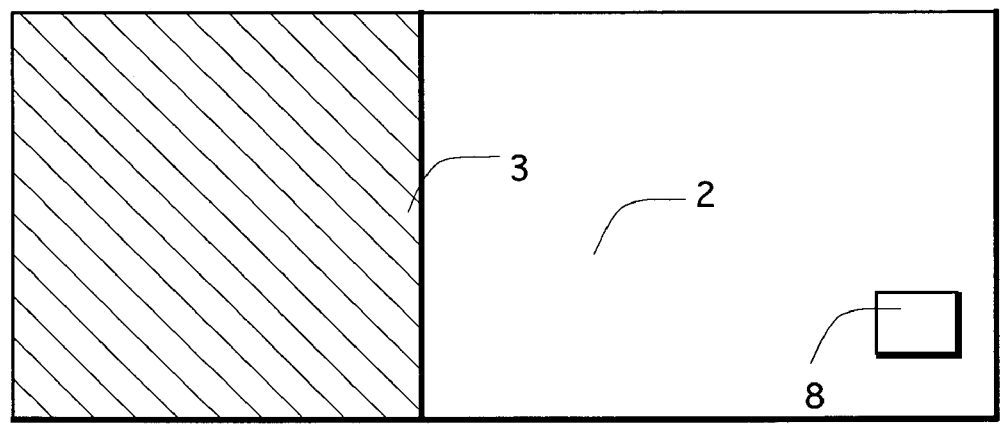
FIG. 2 is a side elevation cross-sectional view taken along line II—II of FIG. 1, with a cross-sectional view in the opposite direction being a mirror image thereof.
Figure 3:
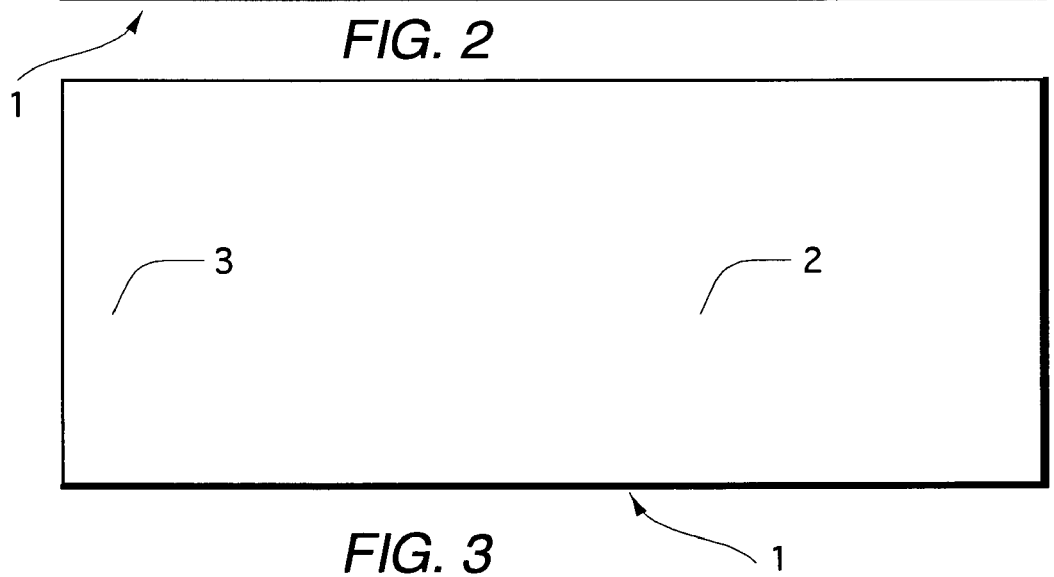
FIG. 3 is a side elevation view of the attachment of FIG. 1, with the opposite side being a mirror image thereof.

The preferred embodiment and best mode of the article of manufacture, as shown in FIGS. 1–3, is an attachment to a vehicle sewage discharge hose (shown in the remaining figures), for reliably guiding and securing the distal end of the vehicle sewage discharge hose relative to the inlet of a relatively stationary sewage receptacle.

Terms of orientation are relative and literally apply to the positions of the drawing figures. For example, a first exemplary system of the attachment connected to a first exemplary hose distal end (temporarily bent corrugated pipe end) is shown in FIGS. 4 to 6, and a second exemplary system of the attachment connected to a second exemplary hose distal end (corrugated pipe with a rigid elbow end) is shown in FIGS. 7 to 9.

As a one-piece body, the attachment 1 has no moving or separable parts. The attachment 1 has two vertical, spaced apart, parallel sidewalls 2 and an end wall 3 rigidly connecting adjacent ends of the sidewalls to form a partially enclosed space, which space is preferably, but not necessarily, rectangular.

With respect to the system of FIGS. 4 to 6, the partially enclosed space of the attachment 1 receives a substantially horizontal distal end portion 4 of the discharge hose 9, an immediately downstream substantially ninety degree temporarily and elastically bent portion 5 of the discharge hose 9, and an immediately downstream substantially vertical straight portion 6 of the discharge hose. The substantially vertical straight portion 6 of the discharge hose 9 extends downwardly into the inlet 7 of a relatively stationary sewage receptacle. The substantially horizontal straight portion 4 of the discharge hose 9 is integrally connected to the remainder of the hose, not shown, which extends to and is connected to a valved sewage discharge pipe of the vehicle, not shown.

Figures 7, 8:
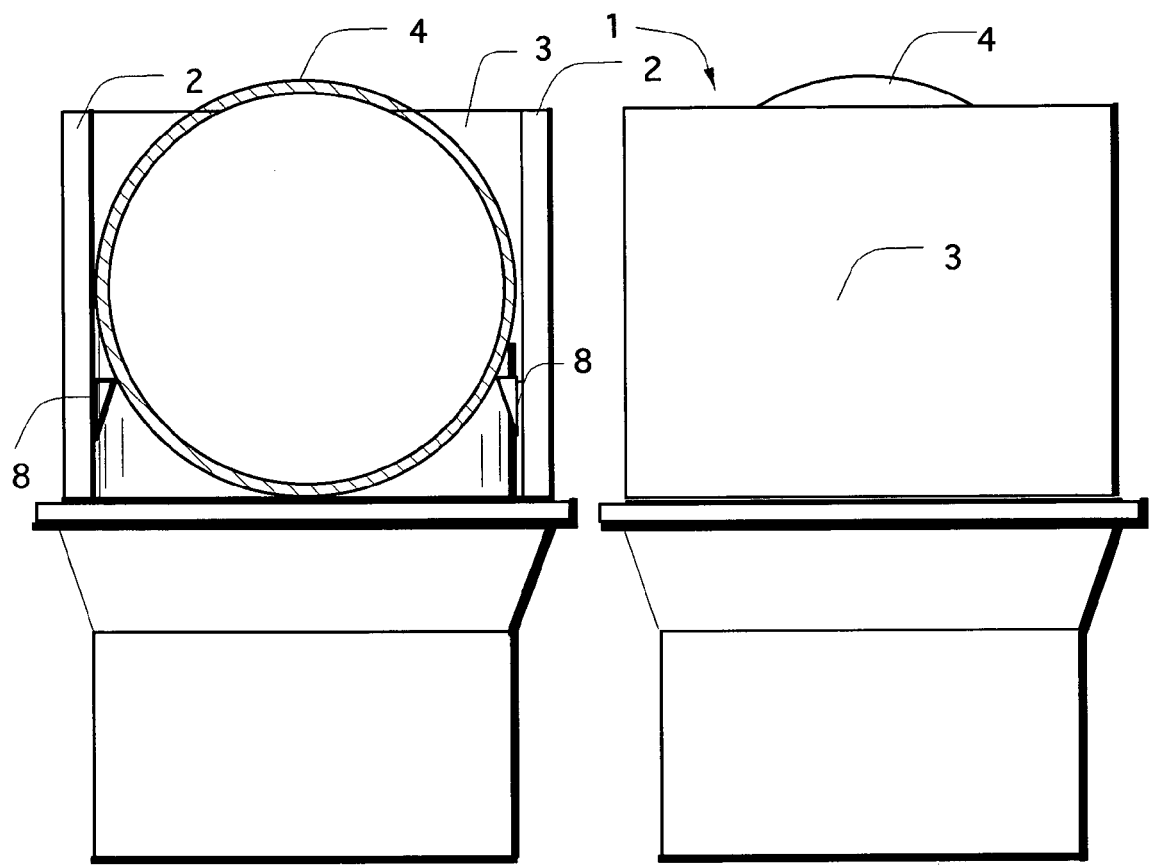
FIG. 7 is an elevation view of the right side of the attachment of FIG. 1 after it has been reoriented by being flipped vertically, with a second example of a sewage disposal hose being received therein.
FIG. 8 is a side elevation cross-sectional view of the attachment, taken along line II—II of FIG. 1 after it has been reoriented by being flipped vertically, with the second example of a sewage disposal hose being received therein.
Figure 9:
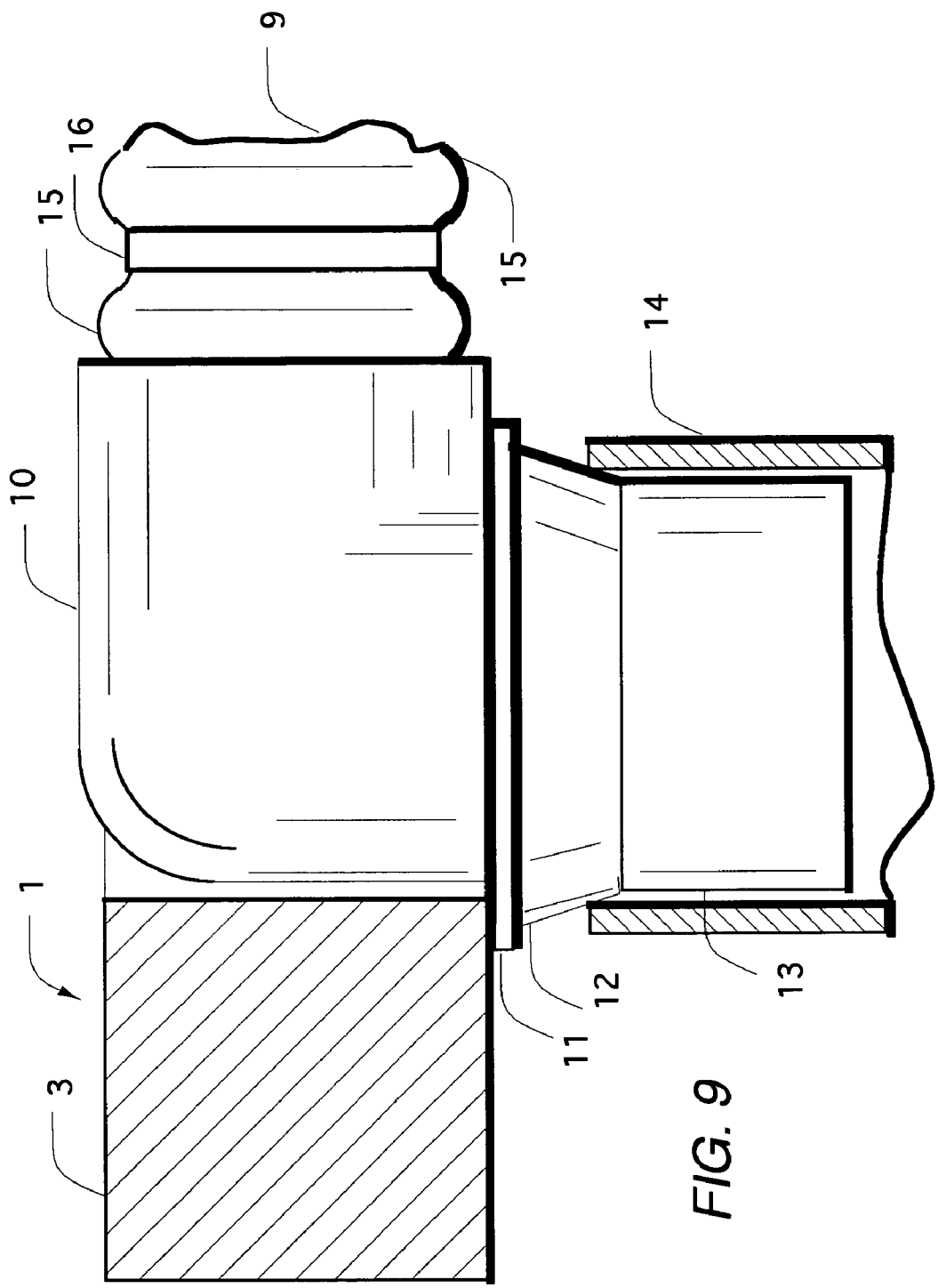
FIG. 9 is a side elevation cross-sectional view of the attachment, taken along line II—II of FIG. 1 after it has been reoriented by being flipped vertically, with the second example of a sewage disposal hose being received therein.

With respect to the system of FIGS. 7 to 9, the distal end of the hose 9 has: a rigid one-piece, preferably molded plastic elbow 10. The elbow 10 has an integral hose nipple (not shown) telescoped into the corrugated portion 15 of the hose 9 and secured by a hose clamp 16. The partially enclosed space of the attachment 1 receives the elbow 10, which has a substantially horizontal round pipe portion integral with and immediately downstream of the corrugated portion 15, an immediately downstream substantially ninety degree portion and an immediately downstream substantially vertical straight portion. The substantially vertical straight portion is followed downstream by integrally connected elements, including a horizontal collar 11 that engages and supports the adjacent portions of the lower edges of the attachment 1, a conical portion 12 that sealingly and supportingly engages a stationary pipe 14 of the receptacle inlet and a terminal round pipe portion 13 that extends downwardly into the inlet pipe 14 of the relatively stationary sewage receptacle. The remainder of the corrugated portion 15 of the hose, not shown, extends to and is connected to a valved sewage discharge pipe of the vehicle, not shown.

This system environment of a recreational vehicle and its discharge hose for temporary connection to a stationary sewage receptacle is broadly exemplified by U.S. Pat. No. 4,796,926 issued Jan. 10, 1989 to Rapsilver, U.S. Pat. No. 5,311,909 issued May 17, 1994 to Adcock, U.S. Pat. No.

5,947,156 issued Sep. 7, 199 to Tomeczyk, and U.S. Pat. No. 5,971,438 issued Oct. 26, 1999 to Johnson, all of whose disclosures are incorporated herein in their entirety.

While examples, including the preferred embodiment, are set forth with respect to the vehicle being a recreational vehicle, the term vehicle is used in a broad sense to include airplanes, trailers, boats, ships, and other portable or movable conveyances that temporarily hold sewage or other waste products in a holding tank and at intervals pump or gravity feed the same through a hose to the inlet of a disposal receptacle.

The sidewalls 2 may be spaced apart somewhat less than the width (diameter in the examples of FIGS. 6 and 9) of the flexible hose 9 or elbow 10, so that the hose is elastically compressed to frictionally engage the sidewalls 2; thereby, the sidewalls 2 function as abutments to assist in frictionally holding the hose. Alternatively, the sidewalls 2 may be spaced apart a distance equal to the width of the hose to reduce vibrations and side movement due to fluid dynamics and most preferably detents 8 are provided as abutments to inter-connect the hose distal end and attachment 1 and thereby prevent accidental disassembly of the hose distal end and attachment 1 during usage. Alternatively, the sidewalls 2 maybe space apart a distance greater than the width of the hose to facilitate insertion of the hose distal end, and detents 8 are provided as abutments to inter-connect the hose distal end and attachment 1 and prevent accidental disassembly of the hose distal end and attachment 1 during usage.

While two detents are shown by way of an example, only one detent may be employed or two additional detents could be added so that the detents would be symetrical about a horizontal mid plane; and in the case of four detents, each detent maybe wedge shaped both upward and downward.

Exemplary construction alternatives of spacing and abutments are set forth, all in dependence upon the advantages desired and the disadvantages to be tolerated.

The sidewalls 2, by way of example, preferably have a horizontal length within a range of substantially greater than the diameter of the sewage hose 9 to twice the diameter of the sewage hose 9 or within a range of greater than the spacing between said sidewalls 2 and twice the spacing between the sidewalls 2.

By way of specific examples: the sidewalls 2 may have a length of 3.5 inches as seen horizontally in FIG. 1, a height of 2.5 inches as seen vertically in FIG. 4, a spacing from each other of 2.75 inches as seen horizontally in FIG. 4, and a thickness of 0.1875 inches for steel or 0.250 inches for plastic as seen horizontally in FIG. 4.

The end wall 3, which is preferably a rectangular solid, may have, for example, a length of 2.5 inches as seen horizontally in FIG. 1, a height of 2.5 inches as seen vertically in FIG. 4, and a width of 3.0 inches for steel or 3.250 for plastic as seen horizontally in FIG. 5.

The detents 8, by way of an example of abutments, may have a horizontal width as seen in FIG. 1 of one-half inch, a height as seen vertically in FIG. 2 of one-half inch, and a depth, as seen horizontally in FIG. 4, that changes progressively from a maximum of 0.125 inches to substantially zero inches. The detents are spaced from the adjacent edge (bottom in FIG. 7 and top in FIG. 4) by an exemplary 0.375 inches.

The broadly set forth abutment, or more specifically a stop, detent 8 or the like interference structure having the disclosed function (hereafter simply referred to as abutment), is the sidewalls 2 when they are spaced to compress the hose, or a top rigid strap (not shown) or additional top wall (not shown) across the top of the sidewalls 2 rigidly connected to sidewall inner faces opposite from the end wall 3 in FIG. 6, or according to the broader aspects of the present invention, to replace or supplement the illustrated detents 8. Each of the above-envisioned abutments has the function to interfere with removal of the discharge hose 9 from the inlet 7 by one or more of the above-named structural features.

In the disclosed embodiment, the detents 8 are located above the bottom edge of the body 1 a distance substantially greater than (FIG. 4) or less than (FIG. 9) one-half the diameter of the distal end of the hose 9 that is in the partially enclosed space. Thereby, as shown in FIG. 4, the detents 8 interfere with the upward withdrawal of the horizontal portion 4 of the hose 9 and interfere with the straightening of the bent portion 5, and as shown in FIG. 6, and the detents 8 retain the attachment as a weight on the elbow 10 by interfering with the counterclockwise pivoting of the attachment relative to the elbow, so that the overhung body 3 acts as a counterweight to the corrugated portion of the hose 15 that extents to the right of the collar 10 in FIG. 9.

The detents 8 are preferably, though not necessarily, wedge shaped for first compressing the adjacent walls of the sewage hose 9 if the hose 9 of FIG. 4 is pushed downwardly between the sidewalls 2 and then when the diameter of the hose 9 passes the detents 8, the detents 8 permit the hose walls to expand, trap and securely hold the hose 9 downward, particularly when the sidewalls 2 are spaced apart less than or substantially equal to the diameter of the hose 9. In this case, the term substantially equal includes a range of sidewall 2 spacing between a minimum spacing compressing the hose 9 to an oval cross-sectional shape that is still within the elastic deformation of material of the hose 9 and a maximum spacing equal to the diameter of the hose 9 plus slightly less than the total depth of the detents 8.

The detents 8 are preferably, though not necessarily, wedge shaped for first compressing the adjacent walls of elbow 10 when the attachment 1 of FIG. 9 is pushed downwardly over the elbow 10 and then when the detents 8 pass the diameter/width of the elbow, the detents 8 permit the elbow walls to expand, trap and securely hold the elbow 10 and attachment 1 in horizontal alignment and prevent accidental relative pivotal disconnection, particularly when the sidewalls 2 are spaced apart less than or substantially equal to the adjacent diameter of the elbow. In this case, the term substantially equal includes a range of sidewall 2 spacing between a minimum spacing compressing the elbow walls to an oval cross-sectional shape that is still within the elastic deformation of material of the elbow 10 and a maximum spacing equal to the diameter of the elbow 10 plus slightly less than the total depth of the detents 8.

The wedge shape of the detents 8 would have no function if the attachment were lowered onto the hose 9 in FIG. 4; therefore, broadly, the detents 8 could be a rectangular solid or the like, but the wedge shape (including round, quarter round, oval, quarter oval shapes) is preferred for its advantages as discussed above with respect to the FIGS. 4 and 9.

The detents 8 are spaced horizontally from each other, as seen in FIG. 4, a distance that is most preferably less than the diameter or width of the hose 9 or adjacent portion of the elbow 10, regardless of the shape of the detents 8, so that the detents 8 will interfere with relative movement of the attachment and the sewage hose distal end.

The detent width, as seen in the horizontal direction of FIG. 1, is most preferably less than the spacing between the adjacent peaks of the corrugated sewage hose, as shown in FIG. 6, to prevent axial movement of the horizontal portion 4 of the hose 9. If used only with an elbow as in FIG. 9, the detent width may be considerably greater or less.

The body, comprising the sidewalls 2, the end wall 3 and the abutment (detents 8 in the most preferred exemplary embodiment) is preferably made of a non-corrosive material, such as aluminum, molded resin, plastic coated steel, or structural foam.

Preferably, the body 1 weighs substantially more than the upward force produced by the elasticity of the portions 4, 5, 6 of hose 9 for FIG. 1 in trying to resume a normal straight shape or the torque of the corrugated portion 15 of the hose in FIG. 9 plus the dynamic fluid forces on the 9.

In discharging sewage from a vehicle, the following steps are performed according to an exemplary usage: insertion of the distal end of the vehicle sewage discharge hose into the inlet 7/14 of a sewage receptacle; providing a one-piece body 1, having two vertical, spaced apart, parallel sidewalls 2 and an end wall 3 rigidly connecting adjacent ends of the sidewalls 2 to form a partially enclosed space; resting the one-piece body 1 on the support surface 9/11 adjacent the inlet 7 and relatively moving the discharge hose and the body 1, thereby receiving within the partially enclosed space, the substantially horizontal portion of the discharge hose, the bent portion and the immediately downstream substantially vertical straight portion for the system of FIG. 1 or FIG. 9; and resisting accidental disengagement of the discharge hose from the inlet 7/14 with the abutment (for example the detents 8) resisting relative movement of the attachment and hose.

Thereby, broadly, the elbow 10 has a horizontal portion, a bent portion and a vertical portion within the partially enclosed space, and the elbow 10 is a part of the discharge hose 9.

The moving and receiving may be performed after the inserting and terminate with the resisting. The resisting includes engaging detents on the sidewalls, between adjacent ridges of the discharge hose as well as engaging the horizontal portion. The resisting includes engaging detents on the sidewalls with opposite upper sides of the horizontal portion of the discharge hose, above (FIG. 1) or below (FIG. 9) the maximum width of the elbow. The resisting includes exerting a downward bias sufficient to at least substantially equal an inherent elasticity bias of the discharge hose 9 tending to straighten out the portions 4, 5, 6 (FIG. 1) and tending to lift up the elbow or pivot the attachment counterclockwise from the elbow (FIG. 9). The resisting includes exerting a downward bias sufficient at least to substantially equal an inherent elasticity bias and dynamic fluid forces of sewage being discharged through the discharge hose.

Accordingly, the present invention is generally used to guide and reliably secure a hose for the transfer of a fluid, particularly sewage, from a vehicle, particularly a recreational vehicle, through the hose to the inlet of a relatively stationary receptacle, particularly at a sewage disposal site.

While the present invention has been described in connection with a number of embodiments, implementations, modifications and variations that have advantages specific to them, the present invention is not necessarily so limited, but covers various obvious modifications and equivalent arrangements according to the broader aspects, all according to the spirit and scope of the following claims.

What is claimed is:

1. An attachment for the outlet end of a recreational vehicle sewage discharge hose and having a normal use position adjacent a vertical downward opening sewage inlet to a sewage receptacle, said attachment comprising:
    a one-piece body having, when in the normal use position, two vertical, spaced apart, substantially parallel sidewalls and at least one additional wall rigidly connecting said sidewalls to form a partially enclosed space;
    said body being dimensioned so that said partially enclosed space receives, a substantially horizontal portion of the hose, an immediately downstream bent portion of the hose and an immediately downstream substantially vertical portion of the hose;
    said body having a rigid abutment positioned to engage the hose and resist removal of the hose from the partially enclosed space; and
    wherein there is only one said additional wall and said additional wall is vertical when said body is in the normal use position.

2. The attachment of claim 1, wherein said abutment includes detents extending horizontally into said partially enclosed space.

3. An attachment for the outlet end of a recreational vehicle sewage discharge hose and having a normal use position adjacent a vertical downward opening sewage inlet to a sewage receptacle, said attachment comprising:
    a one-piece body having, when in the normal use position, two vertical, spaced apart, substantially parallel sidewalls and at least one additional wall rigidly connecting said sidewalls to form a partially enclosed space;
    said body being dimensioned so that said partially enclosed space receives, a substantially horizontal portion of the hose, an immediately downstream bent portion of the hose and an immediately downstream substantially vertical portion of the hose;
    said body having rigid abutment positioned to engage the hose and resist removal of the hose from the partially enclosed space;
    wherein said abutment includes detents extending horizontally into said partially enclosed space; and
    wherein said detents are located above the bottom of said sidewalls a distance substantially greater or substantially less than one-half the spacing between said sidewalls.

4. The attachment of claim 3, wherein said detents, in end view, are generally wedge shaped for first compressing adjacent walls of the sewage hose as the hose moves vertically relatively between said sidewalls and then permitting the hose walls to expand beneath said detents to trap and securely hold the hose and attachment.

5. The attachment of claim 3, wherein said detents have a width, horizontally parallel to said sidewalls, less than spacing between adjacent corrugation peaks of the hose.

6. The attachment of claim 5, wherein said additional wall is vertical and said detents are spaced horizontally from said additional wall a distance at least substantially equal to the diameter of the hose and the radius of curvature of the bent portion.

7. The attachment of claim 1, in combination with the discharge hose, and wherein said discharge hose is flexible and corrugated.

8. The attachment of claim 7, wherein said body weighs at least as much as an upward force produced by elasticity of the hose bent portion.

9. A flexible and corrugated recreational vehicle sewage discharge hose in combination with an attachment for the outlet end of the discharge hose and with said attachment having a normal use position adjacent a vertical downward opening sewage inlet to a sewage receptacle, said attachment comprising:
    a one-piece body having, when in the normal use position, two vertical, spaced apart, substantially parallel sidewalls and at least one additional wall rigidly connecting said sidewalls to form a partially enclosed space;

said body being dimensioned so that said partially enclosed space receives, a substantially horizontal portion of the hose an immediately downstream bent portion of the hose and an immediately downstream substantially vertical portion of the hose;

said body having a rigid abutment positioned to engage the hose and resist removal of the hose from the partially enclosed space; wherein said body weighs at least as much as an upward force produced by elasticity of the hose bent portion;

wherein said additional wall is a vertical end wall; and said abutment includes detents respectively on said sidewalls adjacent the ends of said sidewalls opposite from said end wall and being located above the bottom of said sidewalls a distance substantially greater or substantially less than one-half the spacing between said sidewalls.

10. The attachment of claim 9, wherein said detents, in end view, are generally wedge shaped for first compressing adjacent walls of the sewage hose as the hose moves vertically relatively between said sidewalls and then permitting the hose walls to expand beneath said detents to trap and securely hold the hose and attachment together.

11. The attachment of claim 9, wherein said detents are spaced horizontally from said additional wall a distance at least substantially equal to the diameter of the hose and the radius of curvature of the bent portion.

* * * * *